United States Patent [19]

Rapp et al.

[11] Patent Number: 4,873,038

[45] Date of Patent: Oct. 10, 1989

[54] METHOD FOR PRODUCING CERAMIC/METAL HEAT STORAGE MEDIA, AND TO THE PRODUCT THEREOF

[75] Inventors: Robert A. Rapp, Columbus, Ohio; E. Allen LaRoche, Jr., Middletown, Del.

[73] Assignee: Lanxide Technology Comapny, LP, Newark, Del.

[21] Appl. No.: 69,732

[22] Filed: Jul. 6, 1987

[51] Int. Cl.$^4$ ...................... C04B 35/71; C04B 35/02
[52] U.S. Cl. ........................................ 264/60; 165/10; 428/545; 428/34.5; 428/34.6; 264/65
[58] Field of Search .......................... 165/10, 10 A, 10; 428/403–404, 544, 545, 35; 75/0.5 R; 501/87, 88, 94, 96, 98, 92, 119, 127, 128, 134, 153, 154; 264/60, 65, 56, 59, 66

[56] References Cited

U.S. PATENT DOCUMENTS

| | | |
|---|---|---|
| 2,741,822 | 4/1956 | Udy . |
| 3,255,027 | 6/1966 | Talsma . |
| 3,296,002 | 1/1967 | Hare . |
| 3,298,842 | 1/1967 | Seufert ................................. 106/65 |
| 3,419,404 | 12/1968 | Mao . |
| 3,421,863 | 1/1969 | Bawa . |
| 3,437,468 | 4/1969 | Seufert . |
| 3,473,938 | 10/1969 | Oberlin . |
| 3,473,987 | 10/1969 | Sowards ............................... 156/89 |
| 3,551,101 | 12/1970 | Matsuo et al. ....................... 23/192 |
| 3,789,096 | 1/1974 | Church . |
| 3,864,154 | 2/1975 | Gazza et al. . |
| 3,915,699 | 10/1975 | Umehara et al. ................. 75/208 R |
| 3,973,977 | 8/1976 | Wilson . |
| 4,512,388 | 4/1985 | Claar et al. .......................... 428/403 |
| 4,520,862 | 6/1985 | Helmbold ............................. 165/10 |
| 4,657,067 | 4/1987 | Rapp et al. ............................. 165/1 |

FOREIGN PATENT DOCUMENTS

| | | |
|---|---|---|
| 0116809 | 8/1984 | European Pat. Off. . |
| 0155831 | 9/1985 | European Pat. Off. . |
| 0169067 | 1/1986 | European Pat. Off. . |
| 0193292 | 3/1986 | European Pat. Off. . |

OTHER PUBLICATIONS

"Oxidation of Molten Aluminum Alloys. Reaction with Refractories"—M. Drouzy and M. Richard—Mar., 1974—Fonderie, France No. 332 pp. 121–128.
"Refractories for Aluminum Alloy Melting FUrances'-'—B. Clavaud and V. Jost—Sep., 1980—Lillian Brassinga (from French) Ja., 1985.

Primary Examiner—Wilaim R. Dixon, Jr.
Assistant Examiner—Andrew Griffis
Attorney, Agent, or Firm—Mark G. Mortenson; Michael K. Boyer

[57] ABSTRACT

A heat storage medium comprising a body of parent metal and an intrinsically cohesive ceramic layer formed integrally with the metal body and encapsulating said metal body is produced by the directed oxidation of a body of parent metal outwardly from the surface of said body to form integrally with the body of parent metal a layer of oxidation reaction product which encapsulates unreacted parent metal and forms a cavity resulting from the depletion of aprent metal.

24 Claims, 1 Drawing Sheet

METHOD FOR PRODUCING CERAMIC/METAL HEAT STORAGE MEDIA, AND TO THE PRODUCT THEREOF

FIELD OF THE INVENTION

The present invention relates to a method for making direct-contact heat storage media comprising a metal body encapsulated by an integrally formed ceramic container, and to the product thereof. More particularly, the invention relates to a method for making a heat storage medium by the directed oxidation of a bulk precursor metal to form a ceramic cover integrally with and encapsulating unreacted metal, which undergoes a melting and freezing transformation during service as a heat storage medium.

BACKGROUND OF THE INVENTION, DESCRIPTION OF THE ART AND COMMONLY OWNED PATENT APPLICATIONS

Metals are recognized for their high thermal conductivity relative to various other materials, and are being investigated as heat storage media. In such applications, the metal as the storage medium undergoes successive melting upon heating and freezing upon cooling cycles, and is therefore commonly referred to as a phase charge material. Some metals (and alloys) possess a relatively high latent heat of transformation, and further offer an important advantage for use in heat exchange and storage in that the ratio of heat exchanger area to storage volume can be much smaller, for a given cycle time, than for materials having a poorer thermal conductivity. Additionally, at the melting point of any material, a latent heat of fusion is absorbed. However, at temperatures where latent heat changes could be employed advantageously in heat storage applications, metals generally are not serviceable because they do not retain their shape or rigidity upon melting.

In such a case, an advantageous container for a metal heat storage medium would allow for the transfer of heat between the exterior of the container and the metal, and still retain its mechanical properties despite phase changes (melting and freezing) by the contained metal. Also, an encapsulated phase change material would allow for its direct contact with an energy transporting fluid. A ceramic container, capable of transferring heat to the metal, yet structurally sound enough to contain the metal in service at service temperatures would satisfy these criteria.

U.S. Pat. No. 4,146,057 (granted Mar. 27, 1979 to J. Friedman et al.) discloses an energy storage system for buffering intermittency of and/or asynchronism between an energy supply and energy usage. The energy storage system includes a buffer section comprising a ceramic container filled with aluminum and coupled with a potassium loop and a power and energy output loop. Aside from the generalized statement that a ceramic container is useful for containing aluminum in a heat storage system, there is no disclosure or suggestion as to how the ceramic is produced, let alone being a reaction product layer of the metal.

U.S. Pat. No. 2,823,151 (granted on Feb. 11, 1958 to Yntema et al.) discloses forming a skin comprising an alloy or intermetallic compound on a metal substrate, more particularly a molybdenum metal substrate, in order to render the substrate resistant to oxidation at high temperatures. The skin is described as a molybdenum-silicon-boron alloy or intermetallic compound, and is formed on the molybdenum metal substrate by reacting the underlying molybdenum with silicon and boron, or by plating a non-molybdenum metal substrate with molybdenum, and then reacting the molybdenum with silicon. However, this patent is directed solely to a coating means, and in no way suggests a heat storage medium for the molybdenum is not melted nor does it undergo a melting and freezing transformation. Further, Yntema et al. do not disclose oxidizing the metal base or substrate to produce an encapsulating ceramic container capable of containing the molybdenum metal substrate in a molten state.

British patent application 2,159,542 (filed Mar. 13, 1985 by Zielinger et al.) relates to a method of producing isotropic protective oxide layers on metal surfaces wherein the growth rate of the layer is controlled by varying the oxygen pressure in the growth environment. However, Zielinger et al. do not disclose or suggest growing a ceramic layer of any appreciable strength to contain the coated metal in a molten state nor suggest forming a heat storage medium.

U.S. Pat. No. 4,657,067 to Rapp et al. discloses a thermal storage material utilizing the heat-of-fusion of eutectic alloys such that the outer shell is formed to have a higher melting point than the eutectic core. The material is formed by melting a phase change alloy, and then slowly cooling the melt such that the high melting material present in the gross composition solidifies first and encapsulates the lower-melting, inner eutectic core material.

A novel and useful method for producing self-supporting ceramic bodies by the directed oxidation of a bulk precursor metal (parent metal) is disclosed in the following copending and Commonly Owned Patent Applications. The directed oxidation process lends itself to the process for producing a heat storage medium comprising a self-encapsulating metal.

Accordingly, Commonly Owned U.S. patent application Ser. No. 818,943, filed on Jan. 15, 1986, in the name of Newkirk et al., describes a generic process for producing ceramic materials by the directed oxidation of molten parent metal. In this process, an oxidation reaction product forms initially on the surface of a body of molten parent metal exposed to an oxidant, and then develops outwardly from that surface as molten metal is transported through the oxidation reaction product and into contact with the oxidant at an interface between the oxidant and previously formed oxidation reaction product where it reacts to form a progressively thicker layer of oxidation reaction product. The process may be enhanced by the use of dopants alloyed with the parent metal such as in the case of an aluminum parent metal oxidized in air. This method was improved by the use of dopants applied to the external surface of the parent metal as disclosed in Commonly Owned patent application U.S. Ser. No. 822,999, filed Jan. 17, 1986, in the name of Newkirk et al. In this context, oxidation is considered in its broadest sense to mean one or more metals giving electrons to, or sharing electrons with, another element or combination of elements to form a compound. Accordingly, the term "oxidant" denotes an electron acceptor or sharer In the process described in Commonly Owned U.S. Ser. No. 819,397, filed Jan. 17, 1986, now allowed by Newkirk et al., ceramic composite products are produced by growing a polycrystalline ceramic product into a bed of filler material adjacent to a body of molten parent metal. The molten metal reacts with a gaseous oxidant, such as oxygen, forming a ceramic oxidation reaction product which permeates the filler. The resulting oxidation reaction product, e.g. alumina, can grow into and through the mass of filler as molten parent metal is drawn continuously through the oxidation reaction product and reacted with the oxidant. The filler particles are embedded within the polycrystalline ceramic product comprising a composite oxidation reaction product. The Commonly Owned Patent Applications do not disclose adapting the directed oxidation process to form a ceramic container around a metal substrate. However, the present invention provides a method for utilizing the directed growth process to develop a ceramic container around a metal body to form a heat storage medium.

Commonly Owned patent application U.S. Ser. No. 861,025, filed May 8, 1986, discloses particularly effective methods in which a filler is formed into a preform with a shape corresponding to the desired geometry of the final composite product. The preform is manufactured by conventional methods to have sufficient shape integrity and green strength, and should be permeable to the transport of oxidation reaction product. Also, an admixture of filler materials and mesh sizes may be used.

Barrier materials may be employed to inhibit or arrest substantially the growth of the oxidation reaction product at a selected boundary to define the shape or geometry of the ceramic structure. This invention was disclosed in Commonly Owned U.S. patent application Ser. No. 861,024, filed May 8, 1986, now allowed in the name of Newkirk et al. and entitled "Method of Making Shaped Ceramic Compositions with the Use of a Barrier".

Commonly Owned patent applications U.S. Ser. No. 823,542, filed Jan. 27, 1986, now allowed and U.S. Ser. No. 896,157, filed Aug. 13, 1986, disclose methods for producing cavity-containing ceramic bodies of a size and thickness which are difficult or impossible to duplicate with previously available technology. Briefly, the inventions therein described involve embedding a shaped parent metal precursor in a conformable filler, and infiltrating the filler with a ceramic matrix obtained by oxidation of the parent metal to form a polycrystalline oxidation reaction product of said parent metal with an oxidant and, optionally, one or more metallic constituents. More particularly, in practicing the invention, the parent metal is shaped to provide a pattern, and then is emplaced in or surrounded by a conformable filler which inversely replicates the geometry of the shaped parent metal. In this method, the filler (1) is permeable to the oxidant when required as in the case where the oxidant is a vapor-phase oxidant and, in any case, is permeable to infiltration by the developing oxidation reaction product; (2) has sufficient conformability over the heat-up temperature interval to accommodate the differential thermal expansion between the filler and the parent metal plus any melting-point volume change of the metal; and (3) when required, at least in a support zone thereof enveloping the pattern, is intrinsically self-bonding, whereby said filler has sufficient cohesive strength to retain the inversely replicated geometry with the bed upon migration of the parent metal as described below. The surrounding or emplaced shaped parent metal is heated to a temperature region above its melting point but below the melting point of the oxidation reaction product to form a molten parent metal. The molten parent metal is reacted in that temperature region or interval with the oxidant to form the oxidation reaction product. At least a portion of the oxidation reaction product is maintained in that temperature region and in contact with and between the body of molten metal and the oxidant, whereby molten metal is progressively drawn from the body of molten metal through the oxidation reaction product, concurrently forming the cavity as oxidation reaction product continues to form within the bed of filler at the interface between the oxidant and previously formed oxidation reaction product. This reaction is continued in that temperature region for a time sufficient to at least partially embed the filler with the oxidation reaction product by growth of the latter to form the composite body having the aforesaid cavity therein. Finally, the resulting a self-supporting composite body is separated from excess filler, if any.

The entire disclosures of each of the foregoing Commonly Owned Patent Applications and Patents, which are assigned to the same owner, are expressly incorporated herein by reference.

SUMMARY OF THE INVENTION

In accordance with the present invention, there is provided a method for producing a heat storage medium comprising a metal core or body and an intrinsically cohesive ceramic container. The ceramic container is formed integrally with, and encapsulates, the metal substrate by reacting a portion of a body of molten parent metal with an oxidant, preferably a vapor-phase oxidant. Thus, the ceramic container comprises an oxidation reaction product of a molten parent metal and an oxidant, and the heat storage medium comprises a residual body of unoxidized parent metal not reacted to form the ceramic container.

The body of parent metal is heated in the presence of the oxidant to a temperature above the melting point of the parent metal, but below the melting point of the oxidation reaction product, thereby forming a body of molten parent metal. At that temperature, molten parent metal is reacted with the oxidant outwardly from the surface of the body of parent metal to form a layer of oxidation reaction product which initiates containment of the unreacted body of molten parent metal. Molten parent metal is transported through the encapsulating oxidation reaction product and into contact with the oxidant at the interface between the oxidant and previously formed oxidation reaction product, thereby continuously forming a progressively thicker layer or container of oxidation reaction product developing outwardly from the surface of the body of parent metal, and depleting a quantity of the underlying molten parent metal.

Molten parent metal is transported through the reaction product layer, into contact, and reacted with the oxidant for a time sufficient to develop an encapsulating layer of oxidation reaction product as a ceramic matrix container having sufficient wall thickness to contain the remaining parent metal body comprising unreacted or unoxidized parent metal, and to bear loads during service when the metal body, encapsulated by the shell, may be molten. This shell thickness will depend on such factors as the identity or composition of the parent metal, the dimensions of the parent metal body and end use application parameters or conditions. Thus, the resulting product is a parent metal body comprising unreacted or unoxidized parent metal covered or encapsulated by an intrinsically cohesive ceramic container comprising the oxidation reaction product of molten parent metal and the oxidant. The quantity and volume of unreacted or unoxidized parent metal encapsulated by the ceramic container produced in accordance herewith is less than the quantity and volume of parent metal comprising the parent metal body which is the precursor to the process. Thus, a space or void is inherently developed within the ceramic container due to depletion of a quantity of parent metal which is reacted to form the ceramic container. This void or cavity can absorb expansion of the metal body during service of the storage medium which might otherwise lead to cracking or failure of the ceramic container due to the volume change upon melting the encapsulated body or mismatch in thermal expansion between the ceramic container and the underlying metal body.

In a preferred embodiment, the container comprises a ceramic matrix embedding a suitable filler, preferably a ceramic filler. Accordingly, a mass of filler material is placed adjacent to the surface of parent metal, preferably by applying the filler as a coating to the body of parent metal. Any suitable filler material may be used, such as metal oxides, borides, carbides, or nitrides (e.g. alumina or silicon carbide particles, fibers, or whiskers). A coating of filler material may be applied to the surface of the parent metal body by using a suitable vehicle, such as an organic binder which is combusted or volatilized during the process, to give the coating sufficient inert strength. The parent metal body is then heated, and the molten parent metal reacts with the oxidant to form an encapsulating layer of oxidation reaction product, as described above. The developing oxidation reaction product infiltrates the filler material, and the oxidation reaction is continued for a time sufficient such that the filler material is embedded or infiltrated by the oxidation reaction product. The resulting ceramic container of this embodiment comprises a composite of the ceramic oxidation reaction product and the filler material.

In still a further embodiment, the coating of filler material of the present invention may comprise a material which reacts with certain molten parent metals to form a ceramic support zone to contain or support the molten parent metal during formation of the ceramic container, e.g. silica for an aluminum parent metal system with air as an oxidant. Reaction of the molten parent metal with the oxidant may be preceded or accompanied by reaction of the parent metal with the coating material.

In another embodiment, especially when a filler material is employed, a suitable material, as described in Commonly Owned patent application U.S. Ser. No. 861,024 discussed supra, is positioned adjacent to the coating of filler material thus disposed oppositely from the external surface of the parent metal. Such a barrier material, which preferably is gas-permeable, will substantially prevent or arrest development of the oxidation reaction product at the barrier material, thereby controlling the wall thickness of the ceramic container. This barrier material may comprise, for example, a mixture or slurry of plaster of paris and water, or a bed of particles or fibers such as Wollastonite (a mineral calcium silicate).

As used in this specification and the appended claims, the terms below are defined as follows:

"Ceramic" is not to be unduly construed as being limited to a ceramic material in the classical sense, that is, in the sense that it consists entirely of non-metallic and inorganic materials, but rather refers to a material which is predominantly ceramic with respect to either composition or dominant properties, although the material may contain minor or substantial amounts of one or more metallic constituents and/or porosity (interconnected and isolated) derived from the parent metal, or reduced from the oxidant or a dopant, most typically within a range of from about 1–40% by volume, but may be higher.

"Oxidation reaction product" generally means one or more metals in an oxidized state wherein a metal has given up electrons to or shared electrons with another element, compound, or combination thereof. Accordingly, an "oxidation reaction product" under this definition includes the product of reaction of one or more metals with an oxidant, such as those described in this application.

"Oxidant" means one or more suitable electron acceptors or electron sharers and may be a solid, a liquid or a gas (vapor) or some combination of these (e.g., a solid and a gas) at the process conditions.

"Parent metal" is intended to refer to relatively pure metals, commercially available metals with impurities and/or alloying constituents therein, and alloys and intermetallic compounds of the metals. When a specific metal is mentioned, the metal identified should be read with this definition in mind unless indicated otherwise by the context.

DETAILED DESCRIPTION AND PREFERRED EMBODIMENTS

Figure 1:
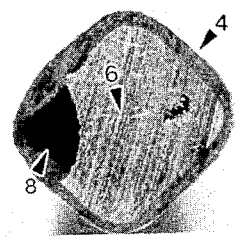
FIG. 1 is a cross-sectional view through the center of a substantially cylindrical heat storage medium produced in accordance with the present invention.

In the practice of the present invention, a parent metal which may be doped (as explained below in greater detail) is shaped into an appropriate form or body, e.g. a sphere, disc, rod or the like. The surface of shaped body of parent metal is exposed to or made accessible to or contacted with an oxidant or oxidizing environment, preferably a vapor-phase oxidant. The surface of the body as used herein refers to the external surface or surfaces, or a portion thereof, which is exposed to the oxidant. Thus, the surface of the body may comprise one or more surfaces, sides, faces, grooves, bores, apertures, protuberances, flanges, or the like. Typically, the metal body is placed on a refractory support, such as a bed of refractory particles, which is permeable with respect to a vapor-phase oxidant when required, and is relatively inert under the process conditions in that this support is not wet by the molten metal. If the parent metal body is placed on an inert bed the metal body may lose its shape during heat-up, but this loss in shape usually is slight and will not interfere with the end use application of the product. Where desired, the parent metal body may be in contact with a solid or liquid oxidant, or be coated with a filler permeable to the growth of oxidation reaction product, as explained below in detail, thereby obviating this loss of shape. The lay-up is contained in a suitable refractory crucible. In the embodiment where the ceramic container embeds a filler material (as described below in greater detail), the metal body may be submerged directly into a bed of suitable filler material, such as particles, fibers, or whiskers contained in a refractory crucible, or first have a coating of filler material applied to the metal surface and then be supported in a crucible. Such fillers are typically ceramic, e.g. alumina, silica, or silicon carbide, and the directed oxidation growth extends to a desired or selected depth, as described below in greater detail.

The resulting lay-up comprising the body of parent metal, a support or bed of refractory particles, typically arranged or contained in a suitable crucible or vessel, is heated in an oxidizing environment to a temperature above the melting point of the parent metal but below the melting point of the oxidation reaction product. However, the operable or preferred range of temperatures may not extend over the entire temperature interval between the melting points of the parent metal and the oxidation reaction product. Accordingly, at this temperature or within this temperature range, the parent metal melts to form molten parent metal, and, on contact with the oxidant, the molten metal reacts to form a layer of oxidation reaction product thereby encapsulating or containing the unreacted molten parent metal. Upon continued exposure to the oxidizing environment, molten parent metal is transported into and through the previously formed encapsulating layer of oxidation reaction product in the direction of, or toward, the oxidant. The transported molten metal contacts the oxidant at the interface between the oxidant, typically the atmosphere, and previously formed oxidation reaction product so as to continually form a progressively thicker encapsulating layer of oxidation reaction product outwardly from the surface of the metal body, and concurrently depleting a quantity of the molten parent metal. Since the ceramic container is developed outwardly by depleting parent metal from within the container, and reacting that metal with the oxidant, a void or shrinkage cavity is developed within the container.

Typically, the ceramic container for a heat storage medium produced in accordance with the invention is thin relative to the thickness or dimension of the unreacted parent metal retained within the container. Thus, the void, inherently developed in the present process, can absorb expansion of the metal substrate upon heating and melting in service which might otherwise cause failure of the ceramic container due to mismatch in thermal expansion between the metal substrate and ceramic container and the volume change upon melting the metal. The reaction is continued for a time sufficient to develop a suitable wall thickness for the encapsulating ceramic layer, cover, or container, thereby forming the container integrally with the underlying unreacted parent metal. However, it should be understood that although the ceramic container is formed integrally with the underlying unreacted parent metal, and a space or void volume develops, the position of this void and/or contained unreacted metal may move, shift, or otherwise be disturbed or redistributed within the container during service of the heat storage medium at temperatures above the melting point or alloy liquidus temperature of the metal body. A wall thickness which is suitable will depend upon factors associated with a particular embodiment such as the identity or composition of the parent metal, the dimensions and geometry of the parent metal body, service parameters and mechanical loads which the heat storage medium will endure in service. For example, a ceramic container approximately 0.04 to 0.1 inch thick, developed on a spherically shaped aluminum alloy parent metal body approximately 1 inch in diameter, has been found sufficient to contain adequately the unoxidized parent metal substrate under a moderate external load at service temperatures in excess of the liquidus temperature of the aluminum alloy.

The ceramic container of the present invention comprises the oxidation reaction product of the molten parent metal with the oxidant. It should be understood that the oxidation reaction product comprising the ceramic container may contain unreacted parent metal and/or porosity which may result from a partial or nearly complete replacement of the metal, but the volume percent of parent metal and/or voids in the ceramic container will depend largely on such conditions as temperature, time, and type of parent metal. The oxidation reaction product phase is in the form of crystallites which are at least partially interconnected, preferably in three dimensions. Thus, the ceramic container exhibits many of the desirable properties of a classical ceramic (i.e., hardness, refractoriness, wear resistance, etc.) while deriving additional benefits (in cases where a significant metal phase is present) from the presence of the distributed or transported unreacted metal phase, notably higher toughness and resistance to fracture, and more importantly in the present context, a higher thermal conductivity across the wall thickness of the ceramic container thus effecting more efficient transfer of energy from the energy source outside of the ceramic container to the metal substrate for storage.

In a preferred embodiment of the invention, a coating material of a suitable fiber is applied to the surface of the parent metal body. The coating material may comprise an inert filler material such as alumina, aluminum nitride, or silicon carbide particles, whiskers, fibers or the like. The filler material is applied to the external surface of the parent metal body by any suitable means and conforms to the geometry of the metal body. For example, the filler material can be admixed with an organic binder such as polyvinyl alcohol or methyl cellulose to give sufficient wet strength during forming, and under process temperatures will be eliminated by evaporation or volatilization. During heat-up and over the temperature interval, the coating of filler material should accommodate the differential thermal expansion between filler and parent metal plus any melting point volume change of the metal. As the molten parent metal reacts with the oxidant, oxidation reaction product develops and infiltrates the bed or coating of filler material. Thus, the resulting ceramic container comprises a composite having a ceramic matrix of oxidation reaction product embedding the constituents of the coating material. Where desired, the coating material may comprise a material which will react at least partially with the molten parent metal. For example, in the case of an aluminum parent metal oxidized in air with alumina as the intended oxidation reaction product, silica or silicon compounds, or boron or boron compounds, may be employed as the filler material. These compounds will react, at least partially, with the molten aluminum parent metal. In such a case, the oxidation reaction of the parent metal with the oxidant may be preceded or accompanied by a reaction of the parent metal with the filler material. The coating of filler materials also may comprise mixtures of reactive and inert materials such as those mixtures present in inorganic clays. Thus, it is possible to tailor the composition or properties of the coating.

In embodiments of the present invention wherein a coating of filler material is employed and applied to the surface of the parent metal, a barrier material, as disclosed in Commonly Owned patent application U.S. Ser. No. 861,024 discussed supra, may be positioned adjacent to the coating material thus disposed oppositely from the surface of the body of parent metal. As discussed in the Commonly Owned Patent Application, growth of the oxidation reaction product is substantially arrested by the barrier means so as to contain the ceramic matrix within the coating of filler material. As disclosed in the above copending U.S. Application, suitable barrier materials may be any material, compound, element, composition, or the like, which, under the process conditions of this invention, maintains some integrity, is not excessively volatile, and preferably is permeable to the vapor-phase oxidant while being capable of locally inhibiting, poisoning, stopping, interfering with, preventing, or the like, continued growth of oxidation reaction product. Suitable barriers for use with aluminum parent metal and oxygen-containing gas oxidants include calcium sulfate (plaster of paris), calcium silicate such as Wollastonite, Portland cement, and combinations of either. Still further, when a barrier material is employed, a suitable refractory particulate may also be included to reduce any possible shrinkage or cracking which otherwise may occur during the process on heating and which would degrade the morphology of the ceramic container. As discussed above, many of these barrier materials are inherently self-supporting when allowed to set or hydrolyze.

Although the invention is described herein with specific reference to aluminum as the preferred parent metal, other suitable parent metals also may be employed which meet the criteria of the invention and are useful heat storage media, such as silicon, titanium, zirconium, hafnium, and tin. Referring now in detail to FIG. 1, there is shown a heat storage medium made in accordance with the invention. The parent metal is preferably a eutectic alloy having a high entropy of fusion, such as an aluminum-silicon alloy having a eutectic of 580° C. at 12.5 weight percent silicon. Hypereutectic alloys and ternary and higher component alloys also can be useful in optimizing heat storage. The heat storage medium includes ceramic container 4 encapsulating the body of parent metal 6, which comprises the remaining non-transported and unreacted parent metal. A space or void 8 resulting from the depletion of the parent metal body is of sufficient volume to absorb expansion of the metal during service.

Certain parent metals useful as a heat storage medium under specific conditions of temperature and oxidizing environment meet the criteria necessary for the directed oxidation reaction with no special additions or modifications. For example, aluminum alloy 4032 containing about 12% silicon and 1% magnesium, by weight, may be particularly useful.

As stated above, the parent metal of the present invention can be a relatively pure metal, e.g. aluminum, but preferably it as an alloy containing a significant silicon and/or carbon content, provided that the parent metal is compatible with the oxidation reaction process. Therefore, the identity of the parent metal can be chosen such as to obtain desired heat storage properties in a resulting heat storage or transfer medium. By varying the alloy constituency of the parent metal, the phase change characteristics of the metal body during service as the particular heat storage medium can be tailored, thus affecting the heat storage properties of the medium. The identity of the metal body of the present invention is therefore not limited to the parent metal, i.e., that metal which will react with the oxidant to form the oxidation reaction product, e.g. aluminum in air to form alumina. For example, aluminum-silicon alloys generally have high heat storage densities, as aluminum and particularly silicon have large entropies of fusion. In accordance with the present invention, an aluminum alloy parent metal having a silicon content of up to about 30 percent by weight can be oxidized to form an alumina oxidation reaction product containment, without reacting an appreciable amount of silicon metal. Thus, the composition of the metal body after oxidation may be different, at least in relative proportion, from the composition of the body of parent metal before commencing the oxidation reaction.

A solid, liquid, or vapor-phase oxidant, or a combination of such oxidants may be used, as noted above. For example, typical oxidants include, without limitation, oxygen, nitrogen, a halogen, sulphur, phosphorus, arsenic, carbon, boron, selenium, tellurium, and compounds and combinations thereof, for example, silica (as a source of oxygen), methane, ethane, propane, acetylene, ethylene, and propylene (as a source of carbon), and mixtures such as air, $H_2/H_2O$ and $CO/CO_2$, the latter two (i.e. $H_2/H_2O$ and $CO/CO_2$) being useful in reducing the oxygen activity of the environment.

A vapor-phase (gas) oxidant is preferred, and specific embodiments of the invention are described herein with reference to use of vapor-phase oxidants. If a gas or vapor oxidant is used, the bedding or coating of filler is permeable to the gas so that upon exposure of the coating of filler to the oxidant, the vapor-phase oxidant permeates the bed of filler to contact the molten parent metal therein. The term "vapor-phase oxidant" means a vaporized or normally gaseous material which provides an oxidizing atmosphere. For example, oxygen or gas mixtures containing oxygen (including air) are preferred vapor-phase oxidants, as in the case where aluminum is the parent metal, with air usually being more preferred for obvious reasons of economy. When an oxidant is identified as containing or comprising a particular gas or vapor, this means an oxidant in which the identified gas or vapor is the sole oxidizer of the parent metal under the conditions obtaining in the oxidizing environment utilized. For example, although the major constituent of air is nitrogen, the oxygen content of air is the oxidizer for the parent metal because oxygen is a significantly stronger oxidant than nitrogen. Air therefore falls within the definition of an "oxygen-containing gas" oxidant but not within the definition of a "nitrogen-containing gas" oxidant. An example of a "nitrogen-containing gas" oxidant as used herein and in the claims is "forming gas", which contains about 96 volume percent nitrogen and 4 volume percent hydrogen.

When a solid oxidant is employed, it is usually dispersed through the entire bedding or filler coating or through a portion of the coating adjacent the parent metal, in the form of particulates or powders admixed with the filler, or perhaps as film or coating on the filler particles. Any suitable solid oxidant may be employed including elements, such as boron or carbon, or reducible compounds, such as silicon dioxide or certain borides of lower thermodynamic stability than the boride reaction product of the parent metal. For example, when a boron or a reducible boride is used as a solid oxidant for an aluminum parent metal, the resulting oxidation reaction product is aluminum boride.

In some instances, the oxidation reaction may proceed so rapidly with a solid oxidant that the oxidation reaction product tends to fuse due to the exothermic nature of the process. This occurrence can degrade the microstructural uniformity of the ceramic body. This rapid exothermic reaction can be avoided by mixing into the composition relatively inert fillers which exhibit low reactivity. Such fillers absorb the heat of reaction to minimize any thermal runaway effect. An example of such a suitable inert filler is one which is substantially the same as the intended oxidation reaction product.

If a liquid oxidant is employed, the entire bed of filler or a portion thereof adjacent the molten metal may be coated, or soaked as by immersion and drying, with the oxidant to impregnate the filler. Reference to a liquid oxidant means one which is a liquid under the oxidation reaction conditions and so a liquid oxidant may have a solid precursor, such as salt, which is molten at the oxidation reaction conditions. Alternatively, the liquid oxidant may be a liquid or a solution, which is used to impregnate part or all of the filler and which is melted or decomposed at the oxidation reaction conditions to provide a suitable oxidant moiety. Examples of liquid oxidants as herein defined include low melting glasses.

The filler material useful in the practice of certain embodiments of the invention is one which, under the oxidation reaction conditions of the invention as described below, is permeable when the oxidant is a vapor-phase oxidant, to passage therethrough of the oxidant. In any case, the filler also is permeable to the growth or development therethrough of oxidation reaction product. The filler also has at the processing temperature, sufficient cohesive strength formed or developed initially or rapidly, so as to retain the geometry inversely replicated therein by conformance of the filler to the body of parent metal as molten metal migrates from the cavity initially filled by the metal body to concurrently (with the migration) form the cavity. If a gaseous oxidant is used, the oxidation reaction product formed is generally impermeable to the surrounding atmosphere, and therefore the furnace atmosphere, e.g. air, can not enter the developing cavity. In this manner, a low pressure region develops within the cavity being formed by migration of the molten parent metal. The developing skin of oxidation reaction product is usually initially too weak to support the pressure differential thus developing across it, combined with gravity forces so that, unsupported, it tends to collapse inwardly, filling at least a part of the areas evacuated by the molten parent metal, and thereby losing the shape of the cavity established initially by the metal body. In order to avoid this collapse, or partial collapse, it is preferable to select a filler which, at a temperature above the melting point of the parent metal and close to (but below) the oxidation reaction temperature, partially sinters or otherwise bonds to itself and to the growing layer of oxidation reaction product sufficiently to provide structural strength from the outside of the cavity to retain the replicated geometry of the mold in the developing cavity at least until the growing oxidation reaction product structure attains sufficient thickness to be self-supporting against the developed pressure differential across the cavity wall.

A suitable self-bonding filler is one which, at the appropriate temperature, either intrinsically sinters or can be made to sinter or bond by appropriate additives or surface modifications of the filler. For example, a suitable filler for use with an aluminum parent metal utilizing an air oxidant comprises alumina powder with an added silica bonding agent as fine particles or castings on the alumina powder. Such mixtures of materials will partially sinter or bond at or below the oxidation reaction conditions under which the ceramic matrix will form. Without the silica additive, the alumina particles require substantially higher temperatures for bonding. Another suitable class of fillers includes particles or fibers which, under the oxidation reaction conditions of the process, form a reaction product skin on their surfaces which tends to bond the particles in the desired temperature range. An example of this class of filler in the case where aluminum is employed as the parent metal and air as the oxidant, is fine silicon carbide particles (e.g. 500 mesh and finer), which forms a silicon dioxide skin bonding themselves together in the appropriate temperature range for the aluminum oxidation reaction.

It is not necessary that the entire mass or bed of filler comprise a sinterable or self-bonding filler or contain a sintering or bonding agent, although such arrangement is within the purview of the invention. The self-bonding filler and/or the bonding or sintering agent may be dispersed only in that portion of the bed or filler adjacent to and surrounding the body of parent metal to a depth sufficient to form upon sintering or otherwise bonding an encasement of the developing cavity which is of sufficient thickness and mechanical strength to prevent collapse of the cavity before a sufficient thickness of the oxidation reaction product is attained. Thus, it suffices if a "support zone" of filler enveloping the mold comprises a filler which is inherently sinterable or self-bonding within the appropriate temperature range or contains a sintering or bonding agent which is effective within the appropriate temperature range. As used herein and in the claims, a "support zone" of filler is that thickness of filler enveloping the parent metal body which, upon bonding, is at least sufficient to provide the structural strength necessary to retain the replicated geometry of the metal body until the growing oxidation reaction product becomes self-supporting against cavity collapse as described above. The size of the support zone of filler will vary depending upon the size and configuration of the metal body and the mechanical strength attained by the sinterable or self-bonding filler in the support zone. The support zone may extend from the surface of the metal body into the filler bed for a distance less than that which the oxidation reaction product will grow or for the full distance of growth. In fact, in some cases the support zone may be quite thin. For example, although the support zone of filler may be a bed of filler encasing the parent metal and itself encased within a larger bed of non-self-bonding or non-sinterable filler, the support zone may in suitable cases comprise only a coating of self-bonding or sinterable particles adhered to the mold by a suitable adhesive or coating agent.

In any case, the filler should not sinter, fuse or react in such a way as to for an impermeable mass so as to block the infiltration of the oxidation reaction product therethrough or, when a vapor-phase oxidant is used, passage of such vapor-phase oxidant therethrough. Further, any sintered mass which does form should not form at such a low temperature as to fracture due to the expansion mismatch between the metal and the filler before the growth temperature is reached, creating a non-homogeneous composite during development of the matrix due to the matrix subsequently solely filling the fractures in the bonded filler. For example, aluminum parent metal undergoes not only thermal expansion upon heating of the solid or molten metal but a significant volume increase on melting. This requires that the bed of filler in which the parent metal mold is embedded not sinter or otherwise self-bond to form a rigid structure encasing the parent metal mold prior to differential expansion thereof with respect to the filler, lest the expansion crack the self-bonded structure.

A bonding or sintering agent may be included as a component of the filler in those cases where the filler would not otherwise have sufficient inherent self-bonding or sintering characteristic to prevent collapse of the ceramic layer being formed into the volume formerly occupied by the parent metal. This bonding agent may be dispersed throughout the filler or in a region near or adjacent to the parent metal. Suitable materials for this purpose include organo-metallic materials which under the oxidizing conditions required to form the oxidation reaction product will at least partially decompose and bind the filler sufficiently to provide the requisite mechanical strength. The binder should not interfere with the oxidation reaction process or leave undesirable residual by-products within the ceramic composite product. Binders suitable for this purpose are well known in the art. For example, tetraethyl orthosilicate is exemplary of suitable organo-metallic binders, leaving behind at the oxidation reaction temperature a silica moiety which effectively binds the filler with the requisite cohesive strength.

As explained in the Commonly Owned Patent Application and Patents, dopant materials, used in conjunction with the parent metal, favorably influence the oxidation reaction process. particularly in systems employing aluminum as the parent metal. The dopant or dopants used in conjunction or in association with the parent metal (1) may be provided as alloying constituents of the parent metal, (2) may be applied to at least a portion of the surface of the parent metal, or (3) may be applied to or incorporated into part or all of the filler material, or any combination of two or more of techniques (1), (2), or (3) may be employed. For example, an alloyed dopant may be used solely or in combination with a second externally applied dopant. In the case of technique (3), wherein additional dopant or dopants are applied to the filler material, the application may be accomplished in any suitable manner as explained in the Commonly Owned Patent Applications.

The function or functions of a particular dopant material can depend upon a number of factors. Such factors include, for example, the particular parent metal, the particular combination of dopants when two or more dopants are used, the use of an externally applied dopant in combination with a dopant alloyed with the precursor metal, the concentration of dopant employed, the oxidizing environment, and the process conditions.

Dopants useful for an aluminum parent metal, particularly with air as the oxidant, include magnesium, zinc, and silicon, either alone or in combination with other dopants, as described below. These metals, or a suitable source of the metals, may be alloyed into the aluminum-based parent metal at concentrations for each of between about 0.1-10% by weight based on the total weight of the resulting doped metal. It should be noted, however, that certain dopants also form useful alloys with the parent metal for exhibiting optimum heat storage characteristics, and therefore the dopant may be used in eutectic ranges. For example, Al-Si or Al-Si-Mg eutectics would provide the dual purpose of a doped parent metal exhibiting high heat storage value. These dopant materials or a suitable source thereof (e.g. MgO, ZnO, or $SiO_2$) may be used externally to the parent metal. Thus an alumina ceramic structure is achievable for the aluminum-silicon parent metal using air as the oxidant by using MgO as a dopant applied to the metal surface in an amount greater than about 0.0008 gram Mg per gram of parent metal to be oxidized and greater than 0.003 gram Mg per square centimeter of parent metal upon which the MgO is applied.

Additional examples of dopant materials for aluminum parent metal include sodium, germanium, tin, lead, lithium, calcium, boron, phosphorus, and yttrium which may be used individually or in combination with one or more other dopants depending on the oxidant and process conditions. Rare earth elements such as cerium, lanthanum, praseodymium, neodymium, and samarium are also useful dopants, and herein again especially when used in combination with other dopants. These dopant materials, as explained in the Commonly Owned Patent Applications, are effective in promoting polycrystalline oxidation reaction product growth for the aluminum-based parent metal systems.

The following non-limiting example of the present invention is intended for illustrative purposes.

EXAMPLE 1

Three cylindrically shaped ingots of an aluminum alloy designated 380.1 (from Belmont Metals, having a nominally identified composition by weight of 8-8.5% Si, 2-3% Zn, and 0.1% Mg as active dopants, and 3.5% Cu as well as Fe, Mn, and Ni but the actual Mg content was sometimes higher as in the range of 0.17-0.18%), measuring 7/8 inch high and 1 inch in diameter, were machined to round off their edges. A thin layer, approximately 0.10 inch thick, of a coating material comprising 50% by weight alumina powder (C-75, unground, from Alcan Aluminum, Ltd.), 20% by weight alumina powder (C-71, regular grind, from Alcan Aluminum, Ltd.), and 30% by weight clay (from Edgar Plastic Kaolin) was applied uniformly to the surface of each ingot. The coating was allowed to dry, and the coated ingots were submerged into a barrier material comprising a uniform admixture of 70% by weight Wollastonite fibers (a mineral calcium silicate, FP grade, from Nyco, Inc.) and 30% by weight plaster of paris (Bondex, from Bondex, Inc.) which was contained by a refractory crucible. This layup, comprising the crucible and its contents, was placed into a furnace supplied with air as the oxidant, and heated up over 4 hours to 950° C. The furnace was held at 950° C. for 60 hours, and then cooled down to ambient over 14 hours.

Figure 2:
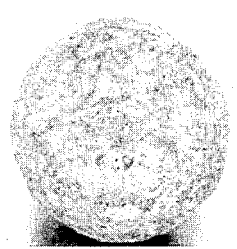
FIG. 2 is a photograph of a plan view of heat storage medium made in accordance with the invention.

The crucible and its contents were removed from the furnace, and the three products were recovered from the crucible. Excess barrier material was removed from their surfaces by light sandblasting. Examination of the products showed that the oxidation reaction product had infiltrated the coating material. One of the three thermal energy storage media was cross-sectioned to reveal the metal substrate and void volume. FIG. 2 is a photograph showing the product as produced, and FIG. 1 is the cross-section of the product showing the ceramic container 4, metal body 6, and void 8. The product was heated from room temperature to 700° C., above the melting point of the metal core, and cooled back to room temperature five times in succession. No cracking or failure of the ceramic container was detected or observed.

What is claimed is:

1. A method for producing a direct contact heat storage medium comprising a body of parent metal and intrinsically cohesive ceramic layer formed integrally with the metal body and encapsulating said parent metal body, which method comprises:
   (a) heating a body of parent metal in the presence of an oxidant to a temperature above the melting point of said parent metal but below the melting point of its oxidation reaction product formed in step (b), to form molten parent metal, and
   (b) at said temperature,
      (i) reacting said molten parent metal with said oxidant outwardly from the surface of said parent metal body to form integrally with the body of parent metal a layer of oxidation reaction product,
      (ii) transporting said molten parent metal through said oxidation reaction product into contact with said oxidant so that fresh oxidation reaction product continues to form at the interface between said oxidant and previously formed oxidation reaction product thereby continuously forming a progressively thicker layer of oxidation reaction product outwardly from said surface and concurrently depleting molten metal from said body,
      (iii) continuing said reaction for a time sufficient to develop said progressively thicker layer to sufficient thickness to substantially completely encapsulate unreacted parent metal and to have a cavity resulting from said depletion, and
   (c) recovering the resulting heat storage medium.

2. A method for producing a heat storage medium comprising a body of parent metal and an intrinsically cohesive ceramic composite container formed integrally with and encapsulating said metal body, which method comprises:
   (a) providing a mass of filler material adjacent to the surface of a body of parent metal,
   (b) heating said body of parent metal in the presence of an oxidant to a temperature above the melting point of said parent metal but below the melting point of its oxidation reaction product formed in step (c), to form molten parent metal,
   (c) and at said temperature,
      (i) reacting said molten parent metal with said oxidant outwardly from the surface of said body to form a layer of oxidation reaction product on said body,
      (ii) transporting said molten parent metal through said oxidation reaction product towards said oxidant and towards and into said mass of filler material so that fresh oxidation reaction product continues to form at the interface between said oxidant and previously formed oxidation reaction product thereby continuously forming a progressively thicker layer of oxidation reaction product infiltrating said filler material outwardly from said surface and concurrently depleting molten metal from said body,
      (iii) continuing said reacting for a time sufficient to develop said progressively thicker layer to sufficient thickness to embed at least a portion of said filler material and thereby substantially completely encapsulating unreacted parent metal and to have a cavity resulting from said depleting, and
   (d) recovering the resulting heat storage medium.

3. The method of claim 1 or claim 2 further comprising providing a barrier means at least partially spaced from said body of parent metal, and continuing said reaction at least until said oxidation reaction product contacts said barrier means to produce said layer having a thickness bounded by said barrier means.

4. The method of claim 1 or claim 2 wherein said parent metal comprises aluminum and said oxidant comprises air.

5. The method of claim 4 wherein said aluminum parent metal comprises a component or mixtures thereof selected from the group consisting of silicon and magnesium.

6. The method of claim 4 wherein said temperature region is from about 690° C. to 1450° C.

7. The method of claim 1 or claim 2 further comprising using a dopant in conjunction with said parent metal.

8. The method of claim 4 further comprising using a dopant in conjunction with said parent metal.

9. The method of claim 2 wherein said oxidant comprises a vapor-phase oxidant, and said mass of filler material is permeable to said oxidant and to infiltration by growth of the oxidation reaction product.

10. The method of claim 9 wherein said parent metal comprises aluminum and said oxidant comprises air, and further comprising using a dopant in conjunction with said parent metal.

11. The method of claim 10 wherein said parent metal comprises an alloy of aluminum and silicon.

12. The method of claim 11 wherein said alloy comprises an eutectic alloy.

13. The method of any one of claims 2, 9, 10, 11 or 12 wherein said providing a mass of filler material further comprises utilizing a mass which: (1) retains sufficient conformability to provide for accommodation of the melting-point volume change of said parent metal and differential thermal expansion between said parent metal and said filler, and (2) provides a support zone thereof enveloping said body of parent metal, being intrinsically self-bonding only at a temperature above the melting point of said parent metal but below and sufficiently close to the oxidation reaction temperature to allow said accommodation, whereby said filler has sufficient cohesive strength capable of preventing collapse of said cavity during transport of said parent metal.

14. The method according to claim 3 wherein said barrier means comprises a material selected from the group consisting of plaster of paris, Portland cement, and calcium silicate, and mixtures thereof.

15. The method according to claim 3 wherein said parent metal comprises aluminum, said oxidant comprises an oxygen-containing gas, and further comprising using a dopant in conjunction with said parent metal, and said barrier means is gas-permeable and comprises a material selected from the group consisting of plaster of paris, Portland cement, and calcium silicate, and mixtures thereof.

16. The method of claim 2 wherein said filler material comprises at least one material selected from the group consisting of a metal oxide, a boride, a carbide, and a nitride.

17. The method of claim 2 wherein said filler material comprises a material selected from the group consisting of alumina, silicon carbide, ceramic coated carbon, silica, clay, aluminum nitride, silicon nitride, titanium diboride, titania, and mixtures thereof.

18. The method of claim 2 further comprising providing a source of a solid oxidant and incorporating said source into said filler material and reacting said source with said parent metal to form said oxidation reaction product.

19. The method of claim 2 further comprising providing a source of a liquid oxidant and incorporating said source into said filler material and reacting said source with said parent metal to form said oxidation reaction product.

20. The method of claim 18 or claim 19 wherein said source is employed in conjunction with a vapor-phase oxidant.

21. The method of claim 1 or claim 2 wherein said parent metal comprises an alloy aluminum and silicon.

22. The method of claim 21 wherein said alloy comprises an eutectic alloy.

23. The method of claim 21 wherein said alloy further includes magnesium.

24. The method of claim 1 or claim 2 wherein said parent metal comprises a material selected from the group consisting of silicon, titanium, zirconium, hafnium, and tin.

* * * * *